Patented Jan. 19, 1926.

1,570,202

UNITED STATES PATENT OFFICE.

EUGENE CHARLES BUCK, OF NEW YORK, N. Y.

VITREOUS COMPOSITION AND ARTICLES MADE THEREFROM.

No Drawing.   Application filed February 26, 1924. Serial No. 695,141.

*To all whom it may concern:*

Be it known that I, EUGENE CHARLES BUCK, a citizen of the Grand Duchy of Luxembourg, and a resident of New York, in the county of New York and State of New York, have invented certain new and useful Improvements in Vitreous Compositions and Articles Made Therefrom, of which the following is a specification.

This invention relates to an improved vitreous composition and involves the provision of a glass composition having several important advantages and characteristics. One of the important advantages of the composition of the invention is its high resistance to the attack of hydrofluoric and fluosilicic acids. The invention includes the improved vitreous composition and the process of making it.

I have discovered that certain complex metaphosphate glasses derived from alumina and the alkali earth metal oxides are highly refractory toward hydrofluoric acid, and that, at the same time, these glasses have the proper plasticity within the range of temperature requisite for manipulation by blowing, pressing, rolling or similar operations.

The improved vitreous composition of the invention is a complex metaphosphate of aluminum and one or more alkali earth metals, such as calcium or magnesium, in which the alkali earth metal is advantageously present in greater molecular ratio than the aluminum.

The invention will be more fully described in connection with the following illustrative examples of glasses of composition typical of the invention. The first of the following tabulations gives the compositions of eight different glasses of the invention in percentage by weight, and the second gives the compositions of the same eight glasses in terms of the molecular ratios of the constituents.

*Compositions in percentage by weight*

| | | | | | | | | |
|---|---|---|---|---|---|---|---|---|
| P₂O₅ | 73.15 | 73.35 | 73.60 | 73.96 | 74.48 | 75.94 | 76.86 | 77.46 |
| CaO | 23.77 | 23.15 | 22.34 | 21.22 | 19.58 | 14.97 | 12.11 | 10.18 |
| Al₂O₃ | 3.08 | 3.50 | 4.06 | 4.82 | 5.94 | 9.09 | 11.03 | 12.36 |

*Compositions in molecular ratios*

| | | | | | | | | |
|---|---|---|---|---|---|---|---|---|
| P₂O₅ | 17 | 15 | 13 | 11 | 9 | 6 | 5 | 9 |
| CaO | 14 | 12 | 10 | 8 | 6 | 3 | 2 | 3 |
| Al₂O₃ | 1 | 1 | 1 | 1 | 1 | 1 | 1 | 2 |

It will be noted that the amount of phosphoric acid (represented as the anhydride $P_2O_5$) present in each of these glasses is sufficient to satisfy the requirements for the formation of the metaphosphate of the associated metal oxides. It will also be noted that the molecular ratio of basic components to the acidic components varies from 15:17 to 5:9, and that the molecular ratio of the alkali earth metal oxide to the alumina varies from 14:1 to 3:2. In the above glasses, the amount of alkali earth metal oxide varies from 32.56 parts to 13.13 parts and the amount of alumina from 3.62 parts to 15.94 parts in compositions including 100 parts by weight of phosphoric anhydride.

The improved glass of the invention can be made by fusing in a fire clay crucible the calculated amounts of ingredients giving the desired composition, making the necessary allowances for losses during melting down of the crucible charge, such as volatilization of phosphoric acid. The alkali earth metal oxide, lime for example, may be incorporated into the batch, as the equivalent amount of the monophosphate, $CaH_4(PO_4)_2$, for example. The alumina may be introduced as such or as the orthophosphate, $AlPO_4$. The phosphoric acid required to form the complex metaphosphate of the invention may be added as phosphoric anhydride or as metaphosphoric acid, (glassy phosphoric acid), making due allowance for the phosphoric acid added in combination with the basic components.

In order to rid the molten glass of any traces of silica taken up from the siliceous material of the crucible, generally less than 1%, an equivalent amount of a fluorine compound such as aluminum fluoride, cryolite or fluorspar may be added to the batch during the course of the melting down operation. Where some silica is present in the fusing mass, the addition of a fluorine compound promotes the agitation of the batch due to the escaping bubbles of silicon fluoride vapors. The effect of any silica present can also be minimized by the addition of an excess of metaphosphoric acid, at least equivalent to the silica present, which then combines with the silica, apparently forming the monosilicyl phosphate, $SiO_2.P_2O_5$.

The coefficient of expansion of the improved glass composition is lowered by the substitution of equivalent molecular amounts of magnesia for lime in the composition.

By altering the relative proportions of the alkali earth metal oxides present in the glass, a glass can be obtained having any desired coefficient of expansion intermediate the high value of a lime-alumina metaphosphate glass and the low value of a magnesia-alumina metaphosphate glass. The vitreous composition of the invention is useful as an enamel coat and regulation of the coefficient of expansion in this manner is sometimes advantageous in such applications.

This also enables the production of compound glasses, that is glasses formed of two or more moulded layers of different glasses but having substantially the same coefficient of expansion. For example, a variety of glass objects may be made by either blowing, pressing or drawing, of which the inner or outer layer, as the conditions may require, is a metaphosphate glass of the invention, and the other layer a siliceous glass, both layers having substantially the same coefficient of expansion and the same range of workability.

The composition of the invention is particularly adapted for making glass ware such as bottles, dishes, stirring rods, and tiles, where resistance to fluorine acids is required. The improved vitreous composition of the invention is also useful in applications where high resistance to the attack of phosphoric acid or the joint attack of phosphoric and hydrofluoric acids is necessary.

Having thus described my invention, what I claim and desire to secure by Letters Patent is:

1. An improved vitreous composition comprising a fused complex metaphosphate of aluminum and an alkali earth metal substantially free from silica.

2. An improved vitreous composition comprising a fused complex metaphosphate of aluminum and an alkali earth metal, the alkali earth metal being present in greater molecular ratio than the aluminum, substantially free from silica.

3. A hydrofluoric acid resistant glass comprising a fused complex metaphosphate of alumina and an alkali earth metal oxide in which the molecular ratio of the alkali earth metal oxide to the alumina is at least 1.5 to 1 substantially free from silica.

4. A hydrofluoric acid resistant glass comprising the fused metaphosphates of lime and alumina substantially free from silica.

5. A hydrofluoric acid resistant glass comprising the fused metaphosphates of lime and alumina, the lime being present in greater molecular ratio than the alumina, substantially free from silica.

6. A hydrofluoric acid resistant glass comprising the fused metaphosphates of lime and alumina, containing for each 100 parts of phosphoric anhydride by weight between 32.56 and 13.13 parts of lime and between 3.62 and 15.94 parts of alumina, substantially free from silica.

7. An improved vitreous composition comprising a fused complex metaphosphate of aluminum and an alkali earth metal substantially free from silica and containing monosilicyl phosphate.

8. A method of making a metaphosphate glass which comprises fusing together alumina and an alkali earth metal oxide and sufficient phosphoric anhydride to form the metaphosphates of the associated oxides.

9. A method of making a metaphosphate glass which comprises fusing together alumina and an alkali earth metal oxide and at least enough of a phosphoric acid compound to form the metaphosphates of the associated oxides.

10. A method of making a metaphosphate glass which comprises fusing together alumina and a phosphoric acid compound containing an alkali earth metal oxide with at least enough of a phosphoric acid compound to form the metaphosphates of all oxides present.

11. A method of making a metaphosphate glass which comprises fusing together phosphoric acid compounds of alumina and alkali earth metal oxides and sufficient of a phosphoric acid compound to form the metaphosphates of the alumina and alkali earth metal oxides.

12. A method of making a metaphosphate glass which comprises fusing together alumina, alkali earth metal oxides and a phosphoric acid compound and adding a fluorine compound to the fusion.

13. An improved vitreous composition comprising the fused metaphosphates of alumina and at least two alkali earth metal oxides substantially free from silica.

14. An improved vitreous composition comprising the fused metaphosphates of alumina, lime and magnesia substantially free from silica.

15. An improved vitreous composition comprising the fused metaphosphates of alumina and an alkali earth metal oxide.

In testimony whereof, I hereunto affix my signature.

EUGENE CHARLES BUCK.